May 6, 1952   P. F. CALIHAN ET AL   2,595,331
COMBINATION VISION MIRROR AND SIGNALING DEVICE
Filed Jan. 30, 1950                                          2 SHEETS—SHEET 1

INVENTORS
PAUL F. CALIHAN
SHELDON A. MORTENSON
BY G. H. Braddock
ATTORNEY

May 6, 1952 P. F. CALIHAN ET AL 2,595,331
COMBINATION VISION MIRROR AND SIGNALING DEVICE
Filed Jan. 30, 1950 2 SHEETS—SHEET 2
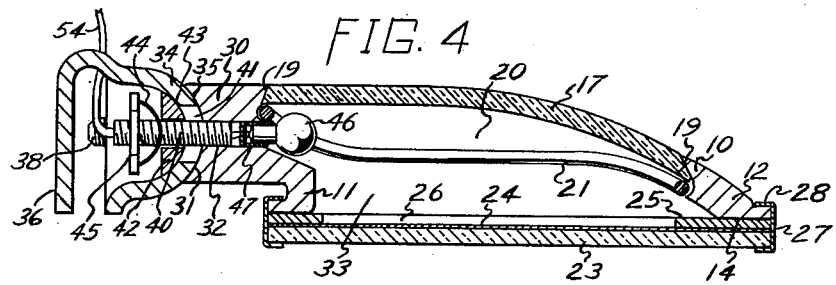
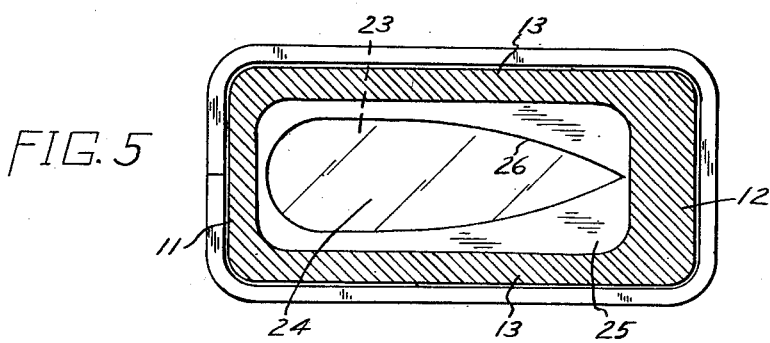
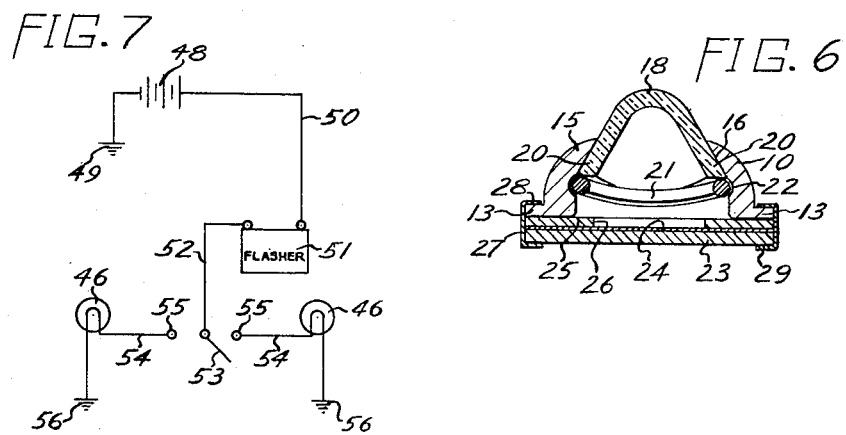
INVENTORS
PAUL F. CALIHAN
SHELDON A. MORTENSON
BY *Jo. H. Braddock*
ATTORNEY Patented May 6, 1952

2,595,331

UNITED STATES PATENT OFFICE 2,595,331

COMBINATION VISION MIRROR AND SIGNALING DEVICE

Paul F. Calihan, Red Wing, and Sheldon A. Mortenson, Minneapolis, Minn.

Application January 30, 1950, Serial No. 141,272

6 Claims. (Cl. 177—329)

The invention herein presents a vision mirror for automotive vehicles which also is equipped to serve or function as a signaling device.

In the accompanying drawings forming a part of this specification,

Fig. 4 is a horizontal, longitudinal sectional view, taken on line 4—4 in Fig. 1;

Fig. 5 is a vertical, longitudinal sectional view, taken on line 5—5 in Fig. 2;

Fig. 6 is a vertical, transverse sectional view, taken on line 6—6 in Fig. 2; and Fig. 7 is a diagrammatic view of a wiring system for electric light bulbs of a pair of combination vision mirrors and signaling devices each made according to the invention.

Figure 1:
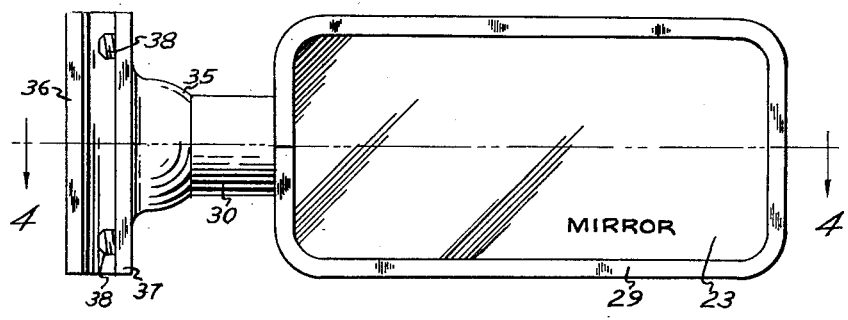
Fig. 1 is a rear elevational view of a combination vision mirror and signaling device incorporating features and characteristics of the invention.
Figure 2:
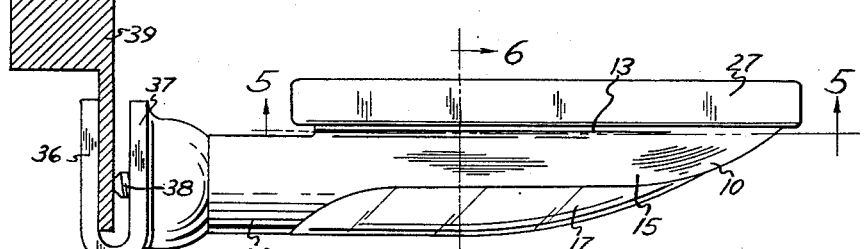
Fig. 2 is a top plan view of the disclosure of Fig. 1.
Figure 3:
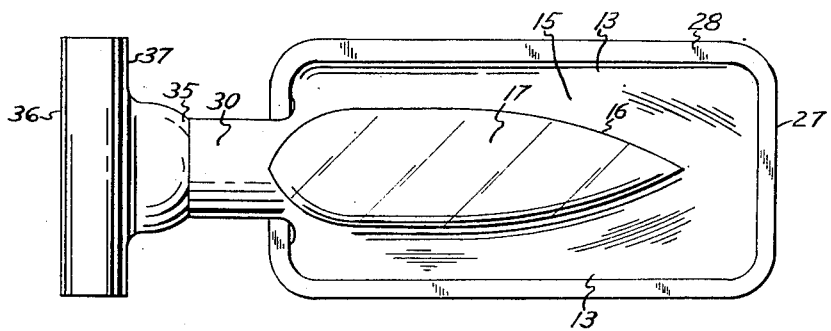
Fig. 3 is a front elevational view of the disclosures of Figs. 1 and 2.

With respect to the drawings and the numerals of reference thereon, 10 denotes a hollowed out block of opaque material of the combination vision mirror and signaling device. The block 10 is of elongated, concave configuration. Its open, rearward side is bounded by opposite end walls, indicated 11 and 12, respectively, and opposite side walls 13, 13 which terminate at the rear of said block in a continuous surface 14, rectilinear as shown, lying in a single plane.

The end walls 11 and 12 and the side walls 13, 13 of the block 10 merge forwardly thereof into a front curvilinear wall 15 of said block, in spaced relation to the continuous surface 14, and said front curvilinear wall 15 has an opening 16 therethrough for receiving a transparent or translucent element 17. As disclosed, the opening 16 is bounded at its opposite sides and ends by surfaces of the front curvilinear wall 15 to be in simulation of a pointer aimed toward the end wall 12 and away from the end wall 11. The transparent or translucent element 17 can be fitted to and retained in the opening 16 in any suitable and convenient manner. As shown, a central longitudinal portion 18 of the transparent or translucent element 17 is bowed or bent forwardly to project beyond the front surface of the curvilinear wall 15, marginal end portions 19, 19 and side portions 20, 20 of said transparent or translucent element are fitted against oblique surfaces bounding the opening 16, and the transparent or translucent element is retained in said opening 16 through the instrumentality of a continuous element 21 seated in a continuous internal groove 22 in the front curvilinear wall 15 and engaged against rearward surfaces of the marginal end portions 19, 19 and side portions 20, 20. The front curvilinear wall 15 can be of glass, or of other suitable material.

A closure cover for the open, rearward side of the hollowed out block 10 consists of a first flat sheet 23 of transparent or translucent material, which may be glass, of rectilinear configuration as disclosed, constituting an outer, rearward element of said closure cover, a thin coat 24 of silvering in sheet form against and spread out over the forward, interior surface of said first flat sheet 23, constituting an intermediate element of the closure cover, and a second flat sheet 25 of opaque material, such as cardboard, engaged against and extending over the surface of said thin coat 24 opposite the first flat sheet 23, constituting an inner, forward element of the closure cover. The second flat sheet 25 of opaque material is cut away, as at 26, to define an opening in simulation of a pointer at the rear of the block 10 also aimed toward the end wall 12 of said block. The construction and arrangement are such that the closure cover for the open, rearward side of the block 10 and the transparent or translucent element 17 are alined in direction from front to rear of said block and situated substantially in parallel vertical planes disposed longitudinally of the block.

Although the closure cover can be secured upon the open, rearward side of the block 10 in any suitable and convenient manner, in the disclosure as made said closure cover is retained upon said block by a rectilinear frame of U-shape in crosssection. A continuous base member 27 of said rectilinear frame is fitted against peripheral portions of the block 10, as well as against peripheral portions of the first and second flat sheets 23 and 25, a continuous interiorly extending forward arm 28 of the rectilinear frame is seated against outer, forward surfaces of the end and side walls of said block 10, and a continuous interiorly extending rearward arm 29 of said rectilinear frame is seated against the margin of the outer, rearward surface of the first flat sheet 23. The U-shape rectilinear frame retains the elements of the closure cover in engaged relation and the second sheet 25 up against the continous surface 14 of the block 10.

The end wall 11 of said block 10 is integral or rigid with a cylindrical member or neck 30 which projects from the block at the end thereof opposite the end wall 12 and is substantially alined with the front curvilinear wall 15.

An end surface 31 of the cylindrical member or neck 30, in spaced relation to the end wall 11, is of concave, part-spherical configuration, and a central, longitudinal passageway 32 through said cylindrical member or neck, disposed between the planes of the transparent or translucent element 17 and the closure cover, is contiguous at its exterior end with the part-spherical end surface 31 and at its interior end with a concavity 33 bounded or defined by the block 10, said transparent or translucent element and said closure cover.

A supporting bracket for the block 10 includes a convex element 34, providing a convex, part-spherical surface 35 to be engaged against the concave, part-spherical end surface 31, and an attachment piece or arm 36 integral with said convex element 34 and disposed in alinement with the cylindrical member or neck 30 in direction longitudinally of the block 10. A flange 37, rigid with a part of the convex element 34 spaced from the convex, part-spherical surface 35 and in spaced, parallel relation to the attachment piece of arm 36, is for receiving clamping screws 38 for securing the combination vision mirror and signaling device upon a part of an automotive vehicle, such as a door 39.

The block 10 is mounted upon the supporting bracket to be capable of being universally adjusted relative thereto. A hollow attaching screw 40 includes an external thread having its inner end portion engaged in an internal thread bounding the passageway 32. A central portion of the convex element 34 adjacent the end surface 31 is cut away, as at 41, and an intermediate portion of said hollow attaching screw extends through said cut-away portion 41 in spaced relation to its bounding surface. A part-spherical, desirably resilient, element 42, slidable upon the hollow attaching screw 40, is adapted to be seated against a concave, part-spherical surface 43, opposite the convex, part-spherical surface 35, of said convex element 34, a concavo-convex washer 44, slidable on said hollow attaching screw at the outer side of the part-spherical element 42, has its convex surface disposed against a flat surface of said part-spherical element, and a nut 45 upon an outer end portion of the external thread of the attaching screw 40 is adapted to be turned home against a peripheral portion of said concavo-convex washer in spaced relation to said part-spherical element thus to secure the part-spherical end surface 31 of the cylindrical member or neck 30 of said block 10 up against the part spherical surface 35 of the convex element 34. It will be apparent that the construction and arrangement are such that the block 10 is mounted upon the supporting bracket to be capable of both rotatable adjustment and lateral swinging adjustment in any direction. When lateral swinging adjustment of said block is accomplished, the part-spherical element 42 will be slid over the part-spherical surface 43 and the part-spherical end surface 31 will be slid over the part-spherical surface 35 while the hollow attaching screw 40 swings in corresponding direction in the cutaway portion 41.

A light bulb 46 within the concavity 33 is suitably and conveniently supported, as at 47, in the interior end of the passageway 32.

In Fig. 7 of the drawings there is disclosed a wiring system for light bulbs, such as 46, of a pair of combination vision mirrors and signaling devices each made according to the invention.

A battery 48, grounded at 49, for energizing said light bulbs may be an ordinary automotive vehicle battery.

A lead wire 50 extends from the battery 48 to an ordinary flasher, contained in a box 51, and a lead wire 52 extends from said flasher to a movable contact element 53 of a manually operable switch. A lead wire 54 extends from each of fixed contact elements 55 selectively to be engaged by the movable contact element 53 to each of light bulbs, such as 46, and the light bulbs are grounded, as at 56.

The construction and arrangement will be such that light will pass through both the transparent or translucent element 17 and the closure cover when the bulb 46 is energized. At the same time, said closure cover is equipped also to serve as a vision mirror. More explicitly stated, the thin coat 24 of silvering will be of nature to at one and the same time permit passage of light from the bulb 46 outwardly of the concavity 33 when said bulb is energized and reflect light rearwardly to extent rendering the first flat sheet 23 and said thin coat 24 of silvering a vision mirror.

As herein described the closure cover is at the rear of the block 10, and thus the mirror is a so-called rear vision mirror. It is to be understood, however, that the principles of the invention also are applicable to so-called front vision mirrors of the type where light is reflected rearwardly from a first mirror to the front of a second, front vision mirror for enabling the operator of an automotive vehicle to see ahead, as past a preceding vehicle.

Assuming the light bulbs of Fig. 7 to be at opposite sides of an automotive vehicle and the provided pointers to be employed to indicate that a turn is to be made, the movable contact element 53 will be manually operated to cause the circuit including the light bulb at the right side of said automotive vehicle to be closed when a right turn is to be made and to cause the circuit including the light bulb at the left side of the automotive vehicle to be closed when a left turn is to be made. At the completion of each turn, said movable contact element will be operated to the open condition for the circuits of both light bulbs.

What is claimed is:

1. A combination vision mirror and signaling device comprising an opaque hollow member having therein a light bulb to be energized, there being openings through spaced, opposite sides of said hollow member for passage of light from said bulb outwardly of the hollow member, and a cover over at least a part of the opening through one of said spaced, opposite sides of said hollow member including a sheet of material pervious to light and a coating of material such as silvering upon an interior surface of said sheet to at one and the same time permit passage of light from said bulb outwardly of said cover and reflect light to extent rendering said cover capable of serving as a vision mirror.

2. A combination vision mirror and signaling device comprising an opaque hollow member having therein a light bulb to be energized, there being openings through spaced, opposite sides of said hollow member for passage of light from said bulb outwardly of the hollow member, and a closure cover for the opening through one of said spaced, opposite sides of said hollow member constituted as a vision mirror consisting of a sheet of material pervious to light and a thin coat of silvering upon an interior surface of said sheet.

3. The combination as specified in claim 1 wherein the opening through the side of said hollow member opposite said cover is in simulation of a first indicator and said cover is adapted to permit passage of light from said hollow member in simulation of a second indicator.

4. The combination as specified in claim 2, and a member pervious to light over the opening through the side of said hollow member opposite said closure cover.

5. The combination as specified in claim 1 wherein the opening through the side of said hollow member opposite said cover is in simulation of a first indicator and said cover is adapted to permit passage of light from said hollow member in simulation of a second indicator, and a member pervious to light over the opening through the side of said hollow member opposite said cover.

6. The combination as specified in claim 2 wherein the opening through the side of said hollow member opposite said closure cover is in simulation of a first indicator and said sheet of material pervious to light and thin coating of silvering are backed by an opaque member in simulation of a second indicator, and a member pervious to light over the opening through the side of said hollow member opposite said closure cover.

PAUL F. CALIHAN.
SHELDON A. MORTENSON.

REFERENCES CITED

The following references are of record in the file of this patent:

UNITED STATES PATENTS

| Number | Name | Date |
| --- | --- | --- |
| 1,353,253 | Livingston et al. | Sept. 21, 1920 |
| 1,368,644 | Mochizuki | Feb. 15, 1921 |
| 1,415,465 | Nigh | May 9, 1922 |
| 1,757,280 | Withrow | May 6, 1930 |
| 2,175,918 | Sauer | Oct. 10, 1939 |